United States Patent Office 3,637,657
Patented Jan. 25, 1972

3,637,657
ALUMINUM COMPLEX OF SULFATED POLYSACCHARIDE AND PROCESS FOR THE PREPARATION THEREOF
Eiji Morii and Tadasuke Numasawa, Nagoya, Kouichi Iwata, Chita-gun, Shoichi Yamagata and Akira Ishimori, Sendai-shi, and Hiromi Hanai, Nagoya, Japan, assignors to Meito Sangyo Kabushiki Kaisha, Nagoya, Japan
No Drawing. Filed Mar. 28, 1969, Ser. No. 811,575
Claims priority, application Japan, Apr. 1, 1968, 43/20,964; Aug. 1, 1968, 43/53,904; Aug. 13, 1968, 43/57,146
Int. Cl. C07c *49/18, 69/32*
U.S. Cl. 260—234 R
2 Claims

ABSTRACT OF THE DISCLOSURE

Aluminum complex of sulfated polysaccharide which exhibits an anti-peptic ulcer activity when orally administered, and which is a complex of water-soluble salts of sulfated polysaccharide and basic aluminum salts of the formula $$Al_{2+n}(OH)_{3n}X_y$$

(wherein X stands for an anion, $n$ is a positive number greater than zero, and $y$ is a positive number equalling 6/valency of X), which have an intrinsic viscosity [$\eta$] of 0.02–1.30 as measured in 1 N aqueous caustic soda solution at 25° C., a sulfur content of 10±1–20% by weight, and an aluminum content of 2–12% by weight; and a process for the preparation thereof.

---

This invention relates to aluminum complexes of sulfated polysaccharides which exhibit an anti-peptic ulcer activity when orally administered, and to a process for the preparation thereof.

Acidic polysaccharides, particularly natural and synthesized sulfated polysaccharides such as heparin are known for their antipeptic ulcer activity. Such polysaccharides also exhibit number of biologically important activities, such as anticoagulant effect on blood, Lipemia clearing effect, diuretic effect, inhibition of various enzyme activities, etc. However, when these sulfated polysaccharides are used in preventive or therapeutic treatments of peptic ulcers, there is great danger that their anticoagulant effect on blood produces fatal secondary effects. Because of this serious defect, such sulfated polysaccharides are not practical as clinical medicines.

We have engaged in extensive research in search of a substance having anti-peptic ulcer activity which is free from the foregoing defect, and as the result discovered that the aluminum complex of sulfated polysaccharides, which are obtained by reacting water-soluble salts of sulfated polysaccharides with basic aluminum salts, exhibit strong anti-peptic ulcer effect when orally administered, without extending the time necessary for coagulation of circulatory blood, and consequently showing no ill secondary effect on the human body.

More specifically, the invention relates to the complex formed of a water-soluble salt of sulfated polysaccharide and a basic aluminum salt represented by a formula $$Al_{2+n}(OH)_{3n}X_y$$

(wherein X is an anion, $n$ is a positive number greater than zero, and $y$ is a positive number equalling 6/valency of X)

said complex having an intrinsic viscosity, [$\eta$], of 0.02–1.30 when measured in 1 N aqueous castic soda at 25° C., a sulfur content of 10±1–20% by weight, and an aluminum content of 2–12% by weight. The invention also relates to a process for the preparation of aluminum complex of sulfated polysaccharides which comprises reacting a water-soluble salt of sulfated polysaccharide with a basic aluminum salt of a formula $$Al_{2+n}(OH)_{3n}X_y$$

(wherein X is an anion, $n$ is a positive number greater than zero, and $y$ is a positive number equalling 6/valency of X), in a solvent selected from the group consisting of water and mixed solvents composed of water and water-miscible organic solvents.

The sulfated polysaccharides useful for the invention include synthesized and natural sulfated polysaccharides, such as sulfated dextran, amylopectin, amylose, cellulose, dextrin, carrageenan, and chondroitin, etc., among which sulfated dextran and amylopectin are particularly preferred. Furthermore, sulfated pectin, heparin, and chitosan can also be used. Preferred sulfur content of those polysaccharides is no less than 12 w./w. percent, particularly 16–20 w./w. percent.

Water-soluble salts of those sulfated polysaccharides can be prepared, for example, by treating such a polysaccharide, e.g., dextran, in the presence of a basic organic solvent, e.g., pyridine, formamide or dimethylformamide, with a sulfating agent, such as chlorosulfonic acid or sulfur trioxide; or by the process comprising treating the polysaccharide with a complex of sulfur trioxide and an organic base such as pyridine, dimethylformamide, trimethylamine, dimethylaniline, etc., adding to the reaction product an organic solvent such as an alcohol or acetone, recovering the resulting precipitate, and converting the same to the corresponding alkali salt, ammonium salt, organic base salt, etc., by treating the precipitate with alkali hydroxide, aqueous ammonia, amine, etc., in the conventional manner.

The basic aluminum salts useful for the invention are expressed by the following general formula:

$$Al_{2+n}(OH)_{3n}X_y$$

(wherein X is an anion such as Cl, Br, $NO_3$, ClO, $SO_4$, etc.; $n$ is a positive number greater than zero, and preferably not greater than 18; and $y$ is a positive number variable with valency of X, equalling 6/valency of X).

Thus, for example, when X is a monovalent anion, $y$ is 6. Those basic aluminum salts can be prepared by, for example, reacting aqueous solution of an aluminum salt, such as aluminum chloride, bromide, nitrate, sulfate, etc., with less than the equivalent of an aqueous solution of alkali hydroxide, alkali carbonate, or aqueous ammonia; or reacting more than the equivalent amount of aluminum hydroxide with an acid; or reacting more than the equivalent amount of metal aluminum with an acid.

In the present invention, "reaction of a water-soluble salt of sulfated polysaccharide with a basic aluminum salt in the presence of a solvent" means that, as has been explained in the above, either the reaction is performed using basic aluminum salts prepared in advance, or it is performed in the concurrent presence of basic salt-forming components in the reaction system, under such conditions as will form the basic aluminum salt.

In practicing the present invention, an aqueous solution of water-soluble salt of sulfated polysaccharide is mixed with a basic aluminum salt which is preferably in the form of an aqueous solution. Preferred concentrations of the two reactants in the solutions are suitably adjustable according to the type, molecular size, degree of esterification (sulfur content), etc. of the sulfated polysaccharide employed, within a range of 1–10 w./v. (weight per volume) percent, respectively. The reaction is normally performed at temperatures not higher than 90° C., preferably under milder conditions such as 10–50° C., with stirring. If desired, temperatures even below 10° C., such as around 5° C. may be employed.

The reaction product may precipitate in the reatcion system by itself. If the voluntary precipitation of object complex does not take place, the precipitation can be easily effected by addition of a water-miscible organic solvent such as an alcohol or acetone.

Furthermore, according to the invention, the reaction is also performable by the steps of dissolving a water-soluble salt of sulfated polysaccharide in a liquid mixture of water and a water-miscible solvent such as aliphatic alcohols of preferably 1–4 carbons, and ketones, preferably acetone, methyl ethyl ketone, etc. and adding thereto a basic aluminum salt or an aqueous solution thereof. In that embodiment, a sulfated polysaccharide-aluminum complex of desired aluminum content can be precipitated in the reaction system, by suitably adjusting the alcohol or ketone concentration in the reaction liquid. Thus according to this last method, a sulfated polysaccharide-aluminum complex of relatively uniform aluminum content can be obtained.

Again, a sulfated polysaccharide-aluminum complex can be similarly obtained, by the steps of mixing an aqueous solution of water-soluble salt of sulfated polysaccharide with aqueous solutions of aluminum salts for forming the basic aluminum salts, optionally adding thereto a water-miscible solvent such as an alcohol, acetone, etc., and treating the resultant solution with an aqueous solution of alkali hydroxide, alkali carbonate, or aqueous ammonia.

Thus obtained sulfated polysaccharide-aluminum complex can be further purified if desired. For example, the complex may be dispersed in suitable amount of water in gel form, and reprecipitated with addition of an alcohol. This procedure may be repeated any desired number of times. Finally the product is washed with alcohol, ether, etc., and dried into powdery, refined product.

As the complexes from water-soluble salts of sulfated polysaccharides and basic aluminum salts obtained in accordance with the subject process, those having an intrinsic viscosity $[\eta]$ of 0.02–1.30 as measured in 1 N aqueous caustic soda at 25° C., preferably 0.06–1.0, a sulfur content of $10\pm1$–20, preferably 13–20, percent by weight, and an aluminum content of 2–12, preferably 4.5–8, percent by weight, are preferred.

Although the reaction products obtained in the subject process are generally referred to as complex, the term "complex" is used not in a limiting sense defined in the dictionary, but is used to broadly designate the products of the foregoing reactions.

The complex is variable mainly by aluminum content, intrinsic viscosity $[\eta]$, and also by sulfur content, type of polysaccharide, etc. Furthermore, its solubility in water varies over a wide range, from completely water-soluble products to water-insoluble products. Since both the salts of the starting sulfated polysaccharides and the basic aluminum salts of the given general formula are water-soluble, a water-insoluble complex obtained in the process indicates that a different compound is formed by the reaction of two starting components. Also the resulting water-soluble complex shows a solubility variation quite different from that of either the water-soluble salt of the staring sulfated polysaccharide or the basic aluminum salt of the foregoing formula, when 4 cc. of saturated brine is added to 25 cc. of a 4 wt. percent aqueous solution of the complex at 20° C. To wit, in such solubility test, neither of the starting compounds forms a precipitate, but the solution of the complex shows white turbidity or forms a white precipitate. Again, in the elementary analysis of the complex of this invention, the data obtained suggest that a part or total of, for example, an alkali metal or ammonium, of a water-soluble salt of sulfated polysaccharide is substituted with the $Al_{2+n}(OH)_{3n}$ portion of the basic aluminum salt employed. Furthermore, when subjected to a Toluidine Blue test (MacIntosh's method), the complex of the invention turns reddish purple in color, indicating the presence of sulfated polysaccharide constituent therein.

Water-soluble salts of sulfated polysaccharides have poor storage stability, and commonly possess the property detrimental to therapeutic use, that is, they tend to degrade (de-sulfating) or discolor, if different in degree, during prolonged storage. This defect is considerably improved in the complex of this invention. Furthermore, as later indicated, the fatal secondary ill effect of anticoagulant action on blood which is inherent in water-soluble salts of sulfated polysaccharides is substantially nil in the complex of this invention, while the complex exhibits excellent anti-peptic ulcer activity.

The complex of this invention, preferably those having an intrinsic viscosity $[\eta]$ of 0.02–1.30 when measured in 1 N aqueous caustic soda at 25° C., particularly 0.06–1.0, a sulfur content of $10\pm1$–20, particularly 13–20, percent by weight, and an aluminum content of 2–12, preferably 4.5–8, percent by weight, can be formed into anti-peptic ulcer compositions, by the admixture of known medical liquid or solid diluent. That is, the complex of the invention can be used in aqueous compositions as solution and syrup as well as in solid compositions such as powder, granule, tablet and capsule. In formulation of such solid compositions, pharmaceutically usable carriers such as lactose, sucrose, starch, dextrin, glucose, mannitol, calcium carbonate, kaolin, calcium phosphate, etc., may be used concurrently. Also as the binders, starch, acacia, gelatine, tragacanth, carboxymethylcellulose, methylcellulose, sodium alginate, etc. may be used. As disintegrators, starch, sodium hydrogencarbonate, calcium citrate, agar powder, etc. can be used.

The anti-peptic ulcer compositions of this invention can also be concurrently used with other medicines normally used for medical treatment and prevention of gastroenteric disorders, such as analgesic, stomachic, enteric medicine, autonomic nervous system blocking agent, etc.

The sulfated polysaccharide aluminum complex obtained in accordance with the invention, for example, sulfated dextran- and dextrin-aluminum complexes were each orally administered to healthy dogs of a body weight around 15 kg. who were fasted for the 24 hours preceding the experiment, at a ratio of 1.2 g. (as the sodium salt) per 1 kg. of body weight. Each predetermined period before and after the administration, the coagulation times of the blood samples taken from the dogs were measured by Lee-White's method. For comparison, similar measurements were made as to water-soluble salts of corresponding sulfated polysaccharides. The results are as given in Table 1, in which each numerical value is the average of measurements as to five dogs, and $[\eta]$ denotes intrinsic viscosity. The percentages are by weight/weight (w./w.).

TABLE 1.—EFFECT OF WATER-SOLUBLE SALTS OF SULFATED POLYSACCHARIDES AND ALUMINUM COMPLEXES THEREOF ON COAGULATION TIME OF CIRCULATORY BLOOD

| Administered sample | | | Coagulation time (min.) | | | | |
|---|---|---|---|---|---|---|---|
| Type | State of sulfated polysaccharide | Aluminum content (percent) | Before administration | After administration | | | |
| | | | | 2 hrs. | 4 hrs. | 6 hrs. | 8 hrs. |
| Sulfated dextran | $S=15.8\%$, $[\eta]=0.032$, sodium salt. | [1] 0 | 9.3±0.9 | >60±0 | >60±0 | >60±0 | >60±0 |
| | | [2] 10.8 | 11.7±0.7 | 11.7±0.7 | 11.3±0.9 | 14.0±0.9 | 15.0±0.6 |
| | $S=17.3\%$, $[\eta]=0.104$, ammonium salt. | [1] 0 | 9.4±0.3 | 20.8±0.8 | 28.6±1.5 | 30.6±2.1 | 38.9±3.5 |
| | | [2] 9.3 | 10.0±0.7 | 11.8±0.9 | 11.0±0.6 | 11.2±0.7 | 11.4±0.5 |
| | $S=19.2\%$, $[\eta]=0.146$, sodium salt. | [1] 0 | 9.0±0.4 | 10.7±0.5 | 11.3±0.3 | 18.0±1.5 | 29.3±2.4 |
| | | [2] 7.0 | 11.0±0.3 | 9.5±0.4 | 10.5±0.2 | 11.5±0.3 | 10.2±0.3 |
| Sulfated dextrin | $S=14.9\%$, $[\eta]=0.07$, sodium salt. | [1] 0 | 10.5±0.4 | >60±0 | >60±0 | >60±0 | >60±0 |
| | | [2] 7.2 | 10.0±0.3 | 10.5±0.6 | 11.3±0.9 | 14.8±0.8 | 16.0±0.8 |
| | $S=17.2\%$, $[\eta]=0.28$, sodium salt. | [1] 0 | 11.0±0.7 | 20.5±1.5 | 27.6±2.4 | 32.3±2.3 | 40.5±2.5 |
| | | [2] 6.5 | 9.5±0.3 | 11.0±0.3 | 10.5±0.2 | 10.3±0.3 | 10.5±0.6 |
| | $S=16.5\%$, $[\eta]=0.42$, sodium salt. | [1] 0 | 10.6±0.5 | 10.3±0.5 | 11.8±0.3 | 16.0±1.5 | 25.5±1.5 |
| | | [2] 7.6 | 11.5±0.4 | 11.7±0.8 | 11.3±0.4 | 10.9±1.0 | 11.0±0.5 |

[1] Water-soluble salt of sulfated polysaccharide (controls).
[2] Sulfated polysaccharide-aluminum complex (this invention).

From the data given in the above table, it can be understood that even those water-soluble salts of sulfated dextran or dextrin, which retard the blood coagulation when absorbed from digestive tracts of tested bodies, exhibit none of such objectionable effect upon oral administration, when they are converted to aluminum complexes thereof.

Separately, for the purpose of examining the therapeutic effect on peptic ulcer of the sulfated polysaccharide-aluminum complexes of the present invention, the following experiments were conducted. Peptic ulcers was formed in male rats of a body weight around 180 g. by Shay's method, and the ulcers in each rat was numbered. Then as to each rat his pyloric ligation was untied and abdominal wall was closed, following daily oral administration of aqueous solution or suspension of the complex specified in Table 2, at a ratio of 50 mg. (as sodium salt) of the complex per 1 kg. of body weight. Three days thereafter the rats were again subjected to laparatomy, and remaining ulcers in each rat was numbered. The changes in ulcer numbers before and after the administration of the subject complexes are shown in Table 2, in contrast to the control results of administering water-soluble salts of sulfated polysaccharides or water only. In the table, each numerical value is the average of ten tested rats, and percentages other than the heal ratio are by weight/weight (w./w.).

TABLE 2.—THERAPEUTIC EFFECT OF WATER-SOLUBLE SALTS OF SULFATED POLYSACCHARIDES AND ALUMINUM COMPLEXES THEREOF ON LABORATORY PEPTIC ULCER

| Administered sample | | Aluminum Content (percent) | Number of ulcers | | Heal ratio (percent) |
|---|---|---|---|---|---|
| Polysaccharide | State of sulfate | | Before administration | After administration | |
| Dextrin | $[\eta]=00.67$, $S=14.9\%$, sodium salt. | [1] 0 | 28.5 | 12.7 | 55.4 |
| | | [2] 7.2 | 29.0 | 5.7 | 80.5 |
| Amylopectin | $[\eta]=0.523$, $S=17.1\%$, sodium salt. | [1] 0 | 28.4 | 8.9 | 68.8 |
| | | [2] 7.4 | 27.9 | 4.8 | 85.4 |
| Amylose | $[\eta]=0.506$, $S=16.8\%$, sodium salt. | [1] 0 | 28.2 | 9.7 | 65.7 |
| | | [2] 6.2 | 29.1 | 4.8 | 83.6 |
| Cellulose | $[\eta]=0.86$, $S=16.0\%$, ammonium salt. | [1] 0 | 28.5 | 10.3 | 63.7 |
| | | [2] 4.9 | 28.0 | 4.9 | 82.5 |
| Carrageenan | $[\eta]=0.315$, $S=14.8\%$, sodium salt. | [1] 0 | 27.8 | 13.0 | 53.2 |
| | | [2] 5.2 | 28.3 | 5.8 | 79.6 |
| Chondroitin sulfate | $[\eta]=0.116$, $S=13.9\%$, sodium salt. | [1] 0 | 28.5 | 12.5 | 56.6 |
| | | [2] 5.0 | 29.2 | 7.2 | 75.5 |
| Dextran | $[\eta]=0.195$, $S=10.1\%$, sodium salt. | [1] 0 | 29.1 | 8.6 | 70.4 |
| | | [2] 6.3 | 28.2 | 2.4 | 91.5 |
| Controls | | | 28.6 | 20.6 | 28.0 |

Note.—In the column of aluminum content, the footnotes 1 and 2 have the same significations explained as to those in Table 1.

From the above results, it can be understood that the sulfated ester-aluminum complexes exhibit greater healing effect on peptic ulers, compared with the water-soluble salts of corresponding sulfated polysaccharides.

For comparison, the therapeutic effect of sulfated monosaccharide- or oligosaccharide-aluminum complexes on peptic ulcer was examined in a manner similar to the foregoing experiments. The results are given in Table 3 below, in which the percentages other than heal ratio are by weight/weight.

TABLE 3.—THERAPEUTIC EFFECT OF WATER SOLUBLE SALTS OF SULFATED MONOSACCHARIDES AND OLIGOSACCHARIDES, AND ALUMINUM COMPLEXES THEREOF, ON LABORATORY PEPTIC ULCER
[Controls and comparative examples only]

| Administered sample | | Aluminum content (percent) | Number of ulcers | | Heal Ratio (percent) |
|---|---|---|---|---|---|
| Saccharide | State of sulfate | | Before administration | After administration | |
| Glucose | S=19.5%, sodium salt. | 0 | 27.6 | 20.3 | 26.3 |
|  |  | 12.5 | 28.0 | 20.0 | 28.4 |
| Sucrose | S=17.3%, sodium salt. | 0 | 28.6 | 20.0 | 29.9 |
|  |  | 10.9 | 29.0 | 20.4 | 29.7 |
| Raffinose | S=16.0%, sodium salt. | 0 | 27.6 | 18.8 | 32.0 |
|  |  | 9.3 | 29.2 | 19.1 | 34.5 |
| Controls | | | 28.6 | 20.6 | 28.0 |

From the foregoing results, it can be understood that the therapeutic effect of aluminum complexes of mono- or oligo-saccharides on peptic ulcers is substantially the same to that of the corresponding water-soluble salts, and that the heal ratio is not much different from that of the control groups treated with water only. Therefore no substantial therapeutic effect is recognized in those complexes.

In Table 4, clinical test results of the sulfated polysaccharide-aluminum complexes obtained in accordance with the invention are given.

EXAMPLE 1

Fifty (50) g. of dextrin having an intrinsic viscosity $[\eta]$ of 0.08 (in water), and a specific rotary power $[\alpha]_D^{20}$ of $+192.9°$ (c.=6, in water) was dissolved in 600 ml. of formamide. While the solution was being cooled to 0–5° C., 135 ml. of chlorosulfonic acid was dropped thereinto to convert the former to sulfated dextrin. Methanol and saturated brine were added to the reaction liquid, and whereupon precipitated product was recovered and converted to the sodium salt thereof by a treatment with sodium hydroxide. The sodium salt was dissolved in water, and the precipitate formed upon addition of methanol to the aqueous solution was recovered. The procedures of dissolving in water and re-precipitating the object compound by addition of methanol were repeated until the desired degree of purification was obtained. Upon drying the final precipitate, 90 g. of sodium salt of sulfated dextrin having a sulfur content of 14.9 wt. percent, and an intrinsic viscosity (in 1 M NaCl solution) of 0.07 was obtained.

TABLE 4.—PATIENTS OF PEPTIC ULCER TREATED BY SINGLE ADMINISTRATION OF SULFATED POLYSACCHARIDE-ALUMINUM COMPLEX

| Case No. | Sex | Age | Diagnosis | Mode of administration | Period of administration | Effect |
|---|---|---|---|---|---|---|
| 1 | F | 67 | Multiple gastric ulcer | 0.5 gm. q.i.d. before meals and retirement | 80 | Healed. |
| 2 | M | 42 | Single gastric ulcer | do | 50 | Do. |
| 3 | M | 45 | Multiple gastric ulcer | do | 65 | Do. |
| 4 | M | 45 | Single gastric ulcer | do | 31 | Do. |
| 5 | M | 49 | do | do | 77 | Do. |
| 6 | F | 68 | do | do | 35 | Do. |
| 7 | M | 42 | Gastric and duodenal ulcer | do | 46 | Do. |
| 8 | M | 60 | Multiple gastric ulcer | do | 24 | Do. |
| 9 | M | 59 | Single gastric ulcer | do | 46 | Do. |
| 10 | M | 30 | Gastric and duodenal ulcer | do | 68 | Do. |
| 11 | F | 61 | Single gastric ulcer | do | 56 | Do. |
| 12 | M | 56 | do | do | 37 | Do. |
| 13 | F | 72 | do | do | 47 | Do. |
| 14 | F | 64 | do | do | 87 | Do. |
| 15 | M | 63 | do | do | 120 | Do. |
| 16 | M | 68 | Multiple gastric ulcer | do | 37 | Do. |
| 17 | M | 43 | Duodenal ulcer | do | 37 | Do. |

NOTE:
Activities of gastric ulcers were judged endoscopically as well as fluoroscopically without exception. No other medicaments which may promote healing of peptic ulcers were used during the period of experiments. Case 9 was treated successfully with the sulfated polysaccharide-aluminum complex, after four months of ineffective treatment with other antiulcer drugs. The other sixteen cases were treated with the sulfated polysaccharides aluminum complex from the beginning of admission.
Case 1 through Case 9 were treated with sulfated dextran-aluminum complex (product of later given Example 7); Cases 10 through 14 were treated with sulfated amylopectin-aluminum complex (product of later given Example 2); and Cases 15 through 17 were treated with carrageenan polysulfate-aluminum complex (product of later given Example 6). No side effect was observed in all seventeen cases.

As demonstrated by the results in above Table 4, sulfated polysaccharide-aluminum complexes exhibit no side effect of interfering with coagulation ability of blood when orally administered, but exhibit excellent healing effect on peptic ulcers. Thus the complexes of the invention are confirmed to be highly useful medicines for treating patients suffering from ulcers.

Ten (10) g. of this sodium salt of sulfated dextrin was dissolved in 100 ml. of water, followed by addition of 35 ml. of methanol.

Separately 7.9 g. of aluminum chloride (hexahydrate) was dissolved in 40 ml. of water, and to the solution 16 g. of 7 w./w. percent aqueous ammonia was gradually added to 60–70° C. to form a transparent aqueous solution of basic aluminum chloride.

This solution (containing 0.89 g. of aluminium) was poured into the aforesaid solution of sodium salt of sulfated dextrin under stirring, and allowed to react for three hours at 25° C. under stirring. Thus formed precipitate was recovered, dispersed in 100 ml. of water, and reprecipitated with addition of 50 ml. of methanol. The resulting precipitate was washed with alcohol and dried at a temperature not higher than 80° C. Thus 9.8 g. of a sulfated dextrin-aluminium complex having an aluminium content of 7.2 wt. percent, sulfur content of 13.4 wt. percent, specific rotatory power $[\alpha]_D^{20}$ of +83.2° (c.=5, in 1 N hydrochloric acid) and an $[\eta]$ of 0.060 (in 1 N aqueous caustic soda) was obtained.

EXAMPLE 2

Fifty (50) g. of amylopectin having an intrinsic viscosity of 0.767 (in water) was sulfated with 150 ml. of chlorosulfonic acid in the manner similar to Example 1. Thus 95 g. of a sodium salt of sulfated amylopectin of a sulfur content of 17.1 wt. percent and an intrinsic viscosity $[\eta]$ of 0.523 (in 1 M aqueous solution of sodium chloride) was obtained. Ten (10) g. thereof was dissolved in 160 ml. of water, and added with 55 ml. of methanol.

To the solution, 62 ml. of aqueous solution of basic aluminium chloride prepared similarly to Example 1 (containing 0.89 g. of aluminium) was poured and so formed precipitate was treated similarly to Example 1. Thus 9.7 g. of sulfated amylopectin-aluminium complex having an aluminium content of 7.4 wt. percent, sulfur content of 15.3 wt. percent, specific rotatory power $[\alpha]_D^{20}$ of +101.8° (c.=2.5, in 1 N hydrochloric acid) and an intrinsic viscosity of 0.470 (in 1 N aqueous caustic soda) was obtained.

EXAMPLE 3

Fifty (50) g. of amylose having an intrinsic viscosity of 2.5 (prepared from potato starch, by the method described in J. Am. Chem. Soc., 71 4066 (1946)) was dissolved in 1,500 ml. of formamide, and subsequently sulfated with 175 ml. of chlorosulfonic acid in the manner similar to Example 1. Thus 95 g. of sodium salt of sulfated amylose having a sulfur content of 16.8 wt. percent and an intrinsic viscosity of 0.52 (in 1 M aqueous solution of sodium chloride) was obtained. Ten (10) g. thereof was dissolved in 210 ml. of water, and added with 70 ml. of acetone.

To this solution 49.6 ml. of an aqueous solution of basic aluminium chloride prepared similarly to Example 1 (containing 0.71 g. of aluminium) was poured, and resulting precipitate was treated also similarly to Example 1. Thus 10.5 g. of sulfated amylose-aluminium complex having an aluminium content of 6.2 wt. percent, sulfur content of 15.3 wt. percent, specific rotary power $[\alpha]_D^{20}$ of +84.7° (c.=2.6, in 1 N hydrochloric acid) and an intrinsic viscosity $[\eta]$ of 0.455 (in 1 N aqueous caustic soda) was obtained.

EXAMPLE 4

Twenty-five (25) g. of sheet-formed pulp having a viscosity of 9.3 cps. (product of San-yo Pulp Co., Japan), cut into 1 cm.² pieces, was wetted in 500 ml. of dimethylformamide for 20 hours at room temperature. Then, while cooling the system to below 5° C., the cellulose was sulfated by dropping into the system 100 ml. of chlorosulfonic acid. Thereafter the precipitate formed by addition of methanol and saturated brine into the reaction liquid was recovered, and treated with aqueous ammonia. Thus formed ammonium salt was dissolved in water, and added with methanol to cause reprecipitation. After such purification by water-methanol reprecipitation method, the final precipitate was dried to provide 38 g. of ammonium salt of sulfated cellulose having a sulfur content of 16.0 wt. percent and an intrinsic viscosity $[\eta]$ of 0.86 (in 1 M aqueous solution of sodium chloride).

Ten (10) g. thereof was dissolved in 200 ml. of water, followed by addition of 115 ml. of methanol. To the solution 50 ml. of aqueous basic aluminium chloride solution prepared in the manner similar to Example 1 (containing 0.71 g. of aluminium) was poured, and the resulting precipitate was treated similarly to Example 1. Thus 10.3 g. of sulfated cellulose-aluminium complex having an aluminium content of 4.9 wt. percent, sulfur content of 14.9 wt. percent, specific rotatory power $[\alpha]_D^{20}$ of −12.1° (c.=2.5, in 1 N hydrochloric acid) and an intrinsic viscosity $[\eta]$ of 0.780 (in 1 N aqueous caustic soda) was obtained.

EXAMPLE 5

Twenty (20) g. of chondroitin sulfate having an intrinsic viscosity $[\eta]$ of 0.45 (in 1 M aqueous solution of sodium chloride) and a sulfur content of 5.6 wt. percent was dissolved in 240 ml. of formamide, and sulfated with 44 ml. of chlorosulfonic acid in the manner similar to Example 1. Thus 25 g. of a sodium salt of chondroitin polysulfate having a sulfur content of 13.9 wt. percent and an intrinsic viscosity $[\eta]$ of 0.12 (in 1 M aqueous solution of sodium chloride) was obtained. Ten (10) g. thereof was dissolved in 150 ml. of water, and added with 64 ml. of ethanol.

Separately, 8.9 g. of aluminium sulfate (octadecahydrate) was dissolved in 33 ml. of water, and to which 18.1 g. of 5 w./w. percent aqueous ammonia was gradually added at 50–60° C. to form a transparent aqueous solution of basic aluminium sulfate which contained 0.72 g. of aluminium. This solution was poured into the previously prepared solution of sodium salt of chondroitin polysulfate, and the resulting white, amorphous crystal was treated in the manner similar to Example 1. Thus 10.9 g. of a chondroitin polysulfate-aluminium complex having an aluminium content of 5.0 wt. percent, sulfur content of 13.0 wt. percent, specific rotatory power $[\alpha]_D^{20}$ of −10.4° (c.=2, in 1 N hydrochloric acid), and an intrinsic viscosity $[\eta]$ of 0.105 (in 1 N aqueous caustic soda) was obtained.

EXAMPLE 6

Thirty (30) g. of carrageenan (product of Copenhagen Pectin Fabrique, Denmark) was suspended in 9 l. of water, and stirred for 4 hours at 25° C., followed by a centrifuge to remove insoluble matter. The supernatant liquid was concentrated under a reduced pressure to 3 l., and to which 15 l. of ethanol was added. Thus formed precipitate was separated and thoroughly washed with ethanol. Upon drying the washed precipitate, 18 g. of purified carrageenan (sulfur content: 8.1 wt. percent, intrinsic viscosity $[\eta]$: 8.5 (in water)) was obtained.

Fifteen (15) g. of this refined carrageenan was dissolved in 450 ml. of formamide, and sulfated with 37.5 ml. of chlorosulfonic acid in the manner similar to Example 1. Whereupon 12.5 g. of a sodium salt of carrageenan polysulfate having a sulfur content of 14.8 wt. percent and an intrinsic viscosity of 0.315 (in 0.1 M sodium chloride solution) was obtained.

Ten (10) g. of the sodium salt was dissolved in 160 ml. of water, and added with 53 ml. of methanol.

To the solution 50 ml. of the basic aluminium chloride solution prepared similarly to Example 1 (containing 0.71 g. of aluminium) was poured, and so formed precipitate was treated similarly to Example 1. Thus 10.7 g. of a carrageenan polysulfate-aluminium complex having an aluminium content of 5.2 wt. percent, sulfur content of 13.7 wt. percent, specific rotatory power $[\alpha]_D^{20}$ of +26.8° (c.=2, in 1 N hydrochloric acid), and an intrinsic viscosity $[\eta]$ of 0.283 (in 1 N aqueous caustic soda) was obtained.

EXAMPLE 7

Fifty (50) g. of a degraded dextran having an intrinsic viscosity $[\eta]$ of 0.402 (in water) was dissolved in 500 ml.

of formamide, and sulfated with 140 ml. of chlorosulfonic acid, similarly to Example 1. Thus 105 g. of a sodium salt of sulfated dextran having a sulfur content of 19.1 wt. percent and an intrinsic viscosity $[\eta]$ of 0.195 (in 1 M sodium chloride solution) was obtained. Ten (10) g. thereof was dissolved in 150 ml. of water, and added with 50 ml. of isopropyl alcohol.

Separately, 3.4 g. of hydrous aluminium oxide was suspended in 25 ml. of water, and the suspension was formed into a solution of basic aluminium nitrate by dropping thereinto 21.2 g. of 10 w./w. percent nitric acid at 80° C., followed by a thorough agitation. This solution (containing 0.81 g. of aluminium) was poured into the aforesaid solution of sodium salt of sulfated dextran, and resulting precipitate was treated in the manner similar to Example 1. Thus 11.5 g. of a sulfated dextran-aluminium complex having an aluminium content of 6.5 wt. percent, sulfur content of 16.0 wt. percent, specific rotatory power $[\alpha]_D^{20}$ of $+77.1°$ (c.=5, in 1 N hydrochloric acid), and an intrinsic viscosity $[\eta]$ of 0.171 (in 1 N aqueous caustic soda) was obtained.

EXAMPLE 8

Ten (10) g. of a sodium salt of sulfated dextran prepared in the manner similar to Example 7 (sulfur content: 19.1 wt. percent, intrinsic viscosity $[\eta]$: 0.195 (in 1 M sodium chloride solution)) was dissolved in 100 ml. of water. To the solution, 118 ml. of a basic aluminium chloride solution prepared similarly to Example 1 (containing 1.69 g. of aluminium) was poured. After 5 hours' stirring, the system was allowed to stand, and so formed precipitate was recovered, washed with water, and further washed with alcohol and dried. Thus 11.7 g. of a sulfated dextran-aluminium complex having an aluminium content of 11.7 wt. percent, sulfur content of 16.0 wt. percent, specific rotatory power $[\alpha]_D^{20}$ of $+78.2°$ (c.=5, in 1 N hydrochloric acid), and an intrinsic viscosity $[\eta]$ of 0.158 (in 1 N aqueous caustic soda) was obtained.

EXAMPLE 9

Ten (10) g. of a sodium salt of sulfated amylose prepared similarly to Example 3 (sulfur content: 16.8 wt. percent, intrinsic viscosity $[\eta]$: 0.52 (in 1 M sodium chloride solution)) was dissolved in 150 ml. of water. Separately, 8.45 g. of aluminium chloride (hexahydrate) was dissolved in 50 ml. of water, and the solution was poured into the aforesaid solution of sodium salt of sulfated amylose, and further 23.8 g. of 5 w./w. percent aqueous ammonia was dropped into the system under stirring. After 2 hours' stirring, methanol was added to the system, and whereby formed precipitate was recovered, dispersed again in water, and reprecipitated by addition of methanol. The precipitate was subsequently separated, washed with alcohol and dried. Thus 9.8 g. of a sulfated amylose-aluminium complex having an aluminium content of 8.5 wt. percent, sulfur content of 14.8 wt. percent, specific rotatory power $[\alpha]_D^{20}$ of $+82.3°$ (c.=2.5, in 1 N hydrochloric acid), and an intrinsic viscosity $[\eta]$ of 0.460 (in 1 N aqueous caustic soda) was obtained.

EXAMPLE 10

Formulation of medical composition (tablets)

| Ingredients: | Amount per tablet (mg.) |
|---|---|
| Sulfated dextran-aluminium complex (Example 7) | 250 |
| Lactose | 150 |
| Polyvinylpyrrolidone | 30 |
| Talc | 50 |
| Calcium stearate | 20 |
| Total | 500 |

Sulfated dextran-aluminium complex and lactose were mixed, and passed through a U.S. standard screen of 60 meshes. The mixture was then wetted with alcoholic polyvinylpyrrolidone, and again passed through a screen of 12 meshes. Thereafter the mixture was granulated and dried at 60° C. Thus dried granules were given a uniform size by sieving through a 16-mesh screen, and added with talc and calcium stearate, followed by tableting into a single tablet weight of 500 mg.

EXAMPLE 11

Formulation of powder

| Ingredients: | Amount (g.) |
|---|---|
| Sulfated amylopectin-aluminum complex (Example 2) | 250 |
| Magnesium aluminate silicate | 150 |
| Cornstarch | 84 |
| Polyvinylpyrrolidone | 16 |
| Total | 500 |

The sulfated amylopectin aluminum complex, magnesium aluminate silicate, and cornstarch were mixed and passed through a 60-mesh screen. The mixture was wetted with alcoholic polyvinylpyrrolidone, and the wetted mass was granulated with a 0.7-mm. diameter stainless steel screen, using a granulator.

EXAMPLE 12

Formulation of granules

| Ingredients: | Amount (g.) |
|---|---|
| Sulfated dextrin-aluminum complex (Example 1) | 250 |
| Sucrose (powdered) | 250 |
| Total | 500 |

Sulfated dextrin-aluminum complex and powdered sucrose were mixed and passed through a 60-mesh screen.

EXAMPLE 13

Formulation of capsules

| Ingredients: | Amount per capsule (mg.) |
|---|---|
| Sulfated amylose-aluminum complex (Example 3) | 250 |
| Lactose | 250 |
| Total | 500 |

Sulfated amylose-aluminum complex and lactose were mixed, and passed through a 60-mesh screen. Then the powder of predetermined amount was filled into a capsule.

EXAMPLE 14

Formulation of syrup

| Ingredients: | Amount (g.) |
|---|---|
| Sulfated cellulose-aluminum complex (Example 4) | 5 |
| Sucrose | 85 |
| Purified water, U.S.P., q.s. 100.0 ml. | |

Five (5) g. of the sulfated cellulose-aluminum complex was dissolved in 45 ml. of purified water, and heated to 50° C. To the solution 85 g. of sucrose was added, dissolved, filtered, and cooled. Thereafter the amount of the syrup was increased to 100 ml., using the purified water.

EXAMPLE 15

Formulation of solution

| Ingredients: | Amount (g.) |
|---|---|
| Carrageenan polysulfate-aluminum complex (Example 6) | 10.000 |
| Sodium saccharin | 0.025 |
| Oil of peppermint | 0.010 |
| Purified water, U.S.P., q.s. 100 ml. | |

Carrageenan polysulfate-aluminum complex and sodium saccharin were dissolved in 70 ml. of warm, purified water, and added with oil of peppermint, followed

EXAMPLE 16

Formulation of granules

| Ingredients: | Amount (g.) |
|---|---|
| Chondroitin polysulfate-aluminum complex (Example 5) | 250 |
| Lactose | 150 |
| Potato starch | 84 |
| Polyvinylpyrrolidone | 16 |
| Total | 500 |

Chondroitin polysulfate-aluminum complex, lactose, and potato starch were mixed, and sieved through a 60-mesh screen. The mixture was wetted with alcoholic polyvinylpyrrolidone, and the wetted mass was granulated with a 0.7-mm. diameter stainless steel screen, using a granulator.

We claim:

1. A complex of a water-soluble salt of a sulfated polysaccharide selected from the group consisting of water-soluble salts of sulfated dextran, amylopectin, amylose, carrageenan, chondroitin, cellulose and dextrin, and a basic aluminum salt of the formula $$Al_{2+n}(OH)_{3n}X_y$$

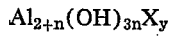

(wherein X represents an anion, $n$ is a positive number not greater than 18, and $y$ is a positive number equalling 6/valency of X), said complex having an intrinsic viscosity $[\eta]$ of 0.02–1.30 as measured in 1 N aqueous caustic soda solution at 25° C., a sulfur content of 10±1–20% by weight, and an aluminum content of 2–12% by weight.

2. The complex of claim 1, wherein X is an anion selected from the group consisting of halogen, $NO_3$, ClO, and $SO_4$.

References Cited

UNITED STATES PATENTS

| 3,057,855 | 10/1962 | Smith et al. | 260—234 |
| 3,175,942 | 3/1965 | Anderson et al. | 260—234 |
| 3,432,489 | 3/1969 | Nitta et al. | 260—234 |
| 3,467,647 | 9/1969 | Benninga | 260—234 |
| 3,498,972 | 3/1970 | Nagasawa | 260—234 |

LEWIS GOTTS, Primary Examiner

J. R. BROWN, Assistant Examiner

U.S. Cl. X.R.

260—209 R, 209.5, 215, 234 D; 424—180